United States Patent
Law et al.

(10) Patent No.: US 12,190,055 B2
(45) Date of Patent: Jan. 7, 2025

(54) MACHINE-LEARNED NATURAL LANGUAGE DOCUMENT PROCESSING SYSTEM

(71) Applicant: TD Ameritrade IP Company, Inc., Omaha, NE (US)

(72) Inventors: Sean Ming-Yin Law, Ann Arbor, MI (US); Logan Sommers Ahlstrom, Ann Arbor, MI (US)

(73) Assignee: Charles Schwab & Co., Inc, San Francisco, CA (US)

( * ) Notice: Subject to any disclaimer, the term of this patent is extended or adjusted under 35 U.S.C. 154(b) by 469 days.

(21) Appl. No.: 17/035,598

(22) Filed: Sep. 28, 2020

(65) Prior Publication Data

US 2022/0100955 A1    Mar. 31, 2022

(51) Int. Cl.
  G06F 40/20    (2020.01)
  G06F 16/93    (2019.01)
  G06N 20/20    (2019.01)

(52) U.S. Cl.
  CPC .............. *G06F 40/20* (2020.01); *G06F 16/93* (2019.01); *G06N 20/20* (2019.01)

(58) Field of Classification Search
  CPC .......... G06F 40/20; G06F 16/93; G06N 20/20
  USPC ........................................................ 704/9
  See application file for complete search history.

(56) References Cited

U.S. PATENT DOCUMENTS

| | | | |
|---|---|---|---|
| 10,817,781 B2 * | 10/2020 | Skiles ................... | G06F 3/0486 |
| 2016/0321582 A1 * | 11/2016 | Broudou ................ | G06N 20/00 |
| 2020/0097557 A1 * | 3/2020 | Houlette .............. | G06Q 10/067 |
| 2020/0184340 A1 * | 6/2020 | Zuo ........................ | G06N 3/045 |
| 2020/0394273 A1 * | 12/2020 | Trim ...................... | G06N 5/025 |
| 2021/0133348 A1 * | 5/2021 | Pham ..................... | G06N 5/025 |
| 2022/0108126 A1 * | 4/2022 | Schieber ............... | G06N 20/00 |

\* cited by examiner

*Primary Examiner* — Tan H Tran
*Assistant Examiner* — Nicholas Hasty
(74) *Attorney, Agent, or Firm* — Harness, Dickey & Pierce, P.L.C.

(57) ABSTRACT

A computer system includes memory configured to store a document database and a machine learning model. The document database includes multiple historical documents each having at least one version labeled as compliant and at least one version labeled as non-compliant. The system includes a creator user interface, a compliance user interface, an automated distribution module, and a model building module configured to train the machine learning model to classify a document according to a compliance score indicating a likelihood of document compliance with one or more compliance criteria. The system also includes an orchestrator module configured to receive the compliance score for the submitted document from the machine learning model, determine whether the compliance score is greater than or equal to a compliance score threshold, and supply the submitted document to the compliance user interface for transmission to the compliance team device when the compliance score is above a threshold.

16 Claims, 9 Drawing Sheets

MACHINE-LEARNED NATURAL LANGUAGE DOCUMENT PROCESSING SYSTEM

FIELD

The present disclosure relates to machine-learned natural language document processing systems.

BACKGROUND

When a company sends communications to customers, the communications may include documents that require compliance review prior to sending out to customers (e.g., to make sure the documents comply with relevant laws, regulations, guidelines, etc.). As the number of documents subject to the compliance review process increases over time, compliance associates spend more and more time reviewing the increasing number of documents, which may include identifying and removing certain words and phrases that do not comply with relevant regulations and guidelines, adding appropriate disclaimers or other phrases, etc. This review process may involve sharing compliance edits with document submitters, and it often takes several rounds of back and forth edits for a document to be approved in order to be sent out to customers.

For example, a submitter may upload a document to a management software database for compliance screening and review. A compliance professional then reviews the document and provides feedback to the submitter. The submitter must then revise the document and resubmit the revised document for further review, based on the feedback from the compliance professional.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory configured to store a document database and a machine learning model. The document database includes multiple historical documents each having at least one version labeled as compliant and at least one version labeled as non-compliant. The system includes a creator user interface configured to receive a submitted document from a document creator device for automated document compliance processing, a compliance user interface configured to transmit the submitted document to a compliance team device for document compliance review, an automated distribution module for transmitting an approved document to a customer computing device, and a model building module configured to obtain the multiple historical documents from the document database and train the machine learning model to classify a document according to a compliance score indicating a likelihood of document compliance with one or more compliance criteria, using the versions of the multiple historical documents that are labeled as compliant and non-compliant as training data. The system also includes an orchestrator module configured to receive the submitted document from the creator user interface, supply the submitted document to the machine learning model, receive the compliance score for the submitted document from the machine learning model, determine whether the compliance score is greater than or equal to a compliance score threshold, and in response to a determination that the compliance score is greater than the compliance score threshold, supply the submitted document to the compliance user interface for transmission to the compliance team device.

In other features, the computer system includes a preprocessing module configured to perform natural language processing on the submitted document prior to supplying the submitted document to the machine learning model to identify at least one word or phrase for adding to a feature vector. In other features, the computer system includes a heuristic module configured to apply one or more rules to the submitted document to generate a heuristic score indicating a likelihood of document compliance with the one or more compliance criteria.

In other features, the heuristic module includes a ruleset database for storing the one or more rules, and the ruleset database is configured to receive one or more rule control inputs from the compliance user interface to modify the stored one or more rules. The heuristic module includes a heuristic score calculation module configured to receive the submitted document from the orchestrator module, determine the heuristic score for the submitted document, and supply the determined heuristic score to the orchestrator module.

In other features, the heuristic module includes a heuristic suggested changes model configured to determine one or more suggested changes to increase a likelihood of compliance of the submitted document with the one or more compliance criteria, according to the ruleset database, and supply the determined one or more suggested changes to the orchestrator module to provide feedback to a document creator via the creator user interface.

In other features, the heuristic module includes a heuristic model building module configured to obtain the multiple historical documents from the document database and modify the one or more rules in the ruleset database for determining the heuristic score, using the multiple historical documents that are labeled as compliant and non-compliant. In other features, the orchestrator module is configured to calculate a total compliance score utilizing the compliance score received from the machine learning model and the heuristic score generated by the heuristic module.

In other features, the orchestrator module is configured to, in response to a determination that the compliance score is less than the compliance score threshold, supply the submitted document back to the creator user interface for further revisions. In other features, the orchestrator module is configured to, in response to supplying the submitted document to the compliance user interface for transmission to the compliance team device, receive a compliance signal from the compliance team device via the compliance user interface, in response to the compliance signal indicating that the submitted document is compliant, supply the submitted document to the automated distribution module for transmitting an approved document to a customer computing device, and in response to the compliance signal indicating that the submitted document is non-compliant, supply the submitted document back to the creator user interface for further revisions.

In other features, the machine learning model includes at least one of a linear regression model, a logistic regression model, a support vector machine model, a random forest model, a gradient boosted tree model, a deep neural network model, and a Bidirectional Encoder Representations from Transformers (BERT) model.

A computerized method of automated natural language document processing using a machine learning model includes obtaining multiple historical documents from a document database. The document database includes multiple historical documents each having at least one version labeled as compliant and at least one version labeled as non-compliant. The method includes training a machine learning module to classify a document according to a compliance score indicating a likelihood of document compliance with one or more compliance criteria, using the versions of the multiple historical documents that are labeled as compliant and non-compliant as training data. The method also includes receiving, via a creator user interface, a submitted document from a document creator device for automated document compliance processing, processing the submitted document using the machine learning module to determine the compliance score for the submitted document, determining whether the compliance score is greater than or equal to a compliance score threshold, and in response to a determination that the compliance score is greater than the compliance score threshold, supplying the submitted document to a compliance team device, via a compliance user interface, for document compliance review.

In other features, the method includes performing natural language processing on the submitted document prior to supplying the submitted document to the machine learning model to identify at least one word or phrase for adding to a feature vector. In other features, the method includes applying one or more rules to the submitted document to generate a heuristic score indicating a likelihood of document compliance with the one or more compliance criteria.

In other features, the method includes receiving one or more rule control inputs from the compliance user interface to modify the one or more rules, the one or more rules stored in a ruleset database. In other features, the method includes determining one or more suggested changes to increase a likelihood of compliance of the submitted document with the one or more compliance criteria, according to the ruleset database, and supplying the determined one or more suggested changes to the creator user interface to provide feedback to a document creator.

In other features, the method includes modifying the one or more rules in the ruleset database for determining the heuristic score, using the multiple historical documents that are labeled as compliant and non-compliant. In other features, the method includes calculating a total compliance score utilizing the compliance score determined by the machine learning model and the heuristic score.

In other features, the method includes, in response to a determination that the compliance score is less than the compliance score threshold, supplying the submitted document back to the creator user interface for further revisions. In other features, the method includes, in response to supplying the submitted document to the compliance user interface for transmission to the compliance team device, receiving a compliance signal from the compliance team device via the compliance user interface, in response to the compliance signal indicating that the submitted document is compliant, supplying the submitted document to an automated distribution module for transmitting an approved document to a customer computing device, and in response to the compliance signal indicating that the submitted document is non-compliant, supplying the submitted document back to the creator user interface for further revisions.

In other features, the machine learning model includes at least one of a linear regression model, a logistic regression model, a support vector machine model, a random forest model, a gradient boosted tree model, a deep neural network model, and a Bidirectional Encoder Representations from Transformers (BERT) model.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

When a company sends communications to customers, the communications may include text that requires compliance review prior to sending (e.g., to make sure the documents comply with relevant compliance criteria such as laws, regulations, guidelines, etc.). As the number of documents subject to the compliance review process increases over time, compliance associates spend more and more time reviewing the increasing number of documents, which may include identifying and removing certain words and phrases that do not comply with relevant compliance criteria, adding appropriate disclaimers or other phrases, etc. This review process may involve sharing compliance edits with document submitters, and it often takes several rounds of back and forth edits for a document to be approved in order to be sent out to customers.

For example, a submitter may upload a document to a management software database for compliance screening and review. A compliance professional then reviews the document and provides feedback to the submitter. The submitter must then revise the document and resubmit the revised document for further review, based on the feedback from the compliance professional. Multiple rounds of back and forth reviewing, revising, and resubmitting, build up a history of document versions in the database that show changes to the documents over time during the compliance review process.

Figure 1:
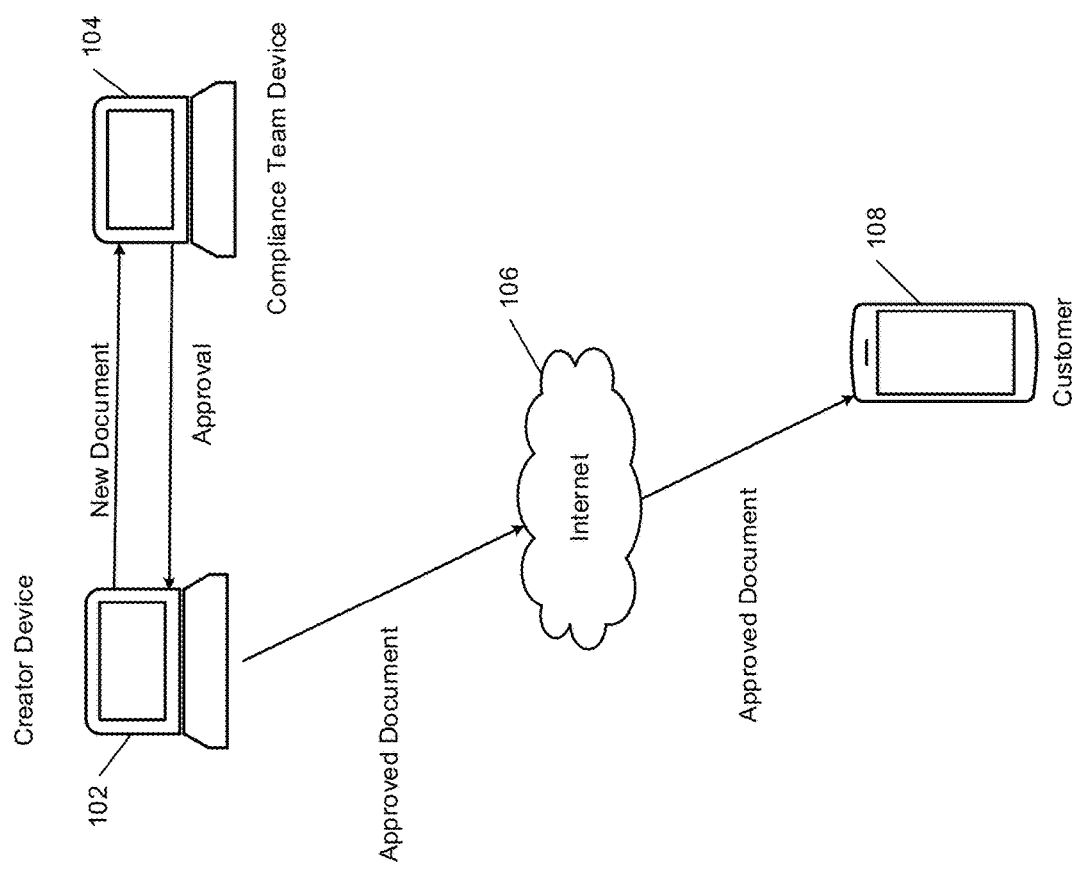
FIG. 1 is a functional block diagram of a system for manual document compliance review, according to the prior art.

FIG. 1 illustrates an example system for manual document compliance review according to the prior art. As shown in FIG. 1, a creator device 102 sends a new document to a compliance team device 104 for review. For example, any business unit in a company (e.g., marketing, retail, institutional, etc.) may create documents for customers for mailing, inclusion in emails, display on websites, etc. These documents typically have to go through manual compliance review before they are actually sent out to the customers. The submitted documents are reviewed at the compliance team device 104 by a compliance professional. If there are any compliance issues in the submitted document, the compliance professional sends the document back with edits or feedback, and the submitter revises the document before resubmitting the document for another review by the compliance professional. Once the document is approved, the document creator sends the approved document to the customer, such as by transmitting the compliant document to a computing device 108 of the customer via the Internet 106 or other network, etc.

In various implementations of the present disclosure, pre-screener systems incorporate machine learning model(s) to automate initial screening of all documents or other communications that are subject to compliance review. The pre-screener systems may dramatically reduce the amount of time that compliance associates spend reviewing documents by identifying non-compliant portions, may provide feedback to the document submitters, may increase standardization of review and make document compliance more uniform, may reduce the use of company resources and increase system efficiency for compliance review, may reduce the amount of time between document creation and transmission to the customer, etc.

Figure 2A:
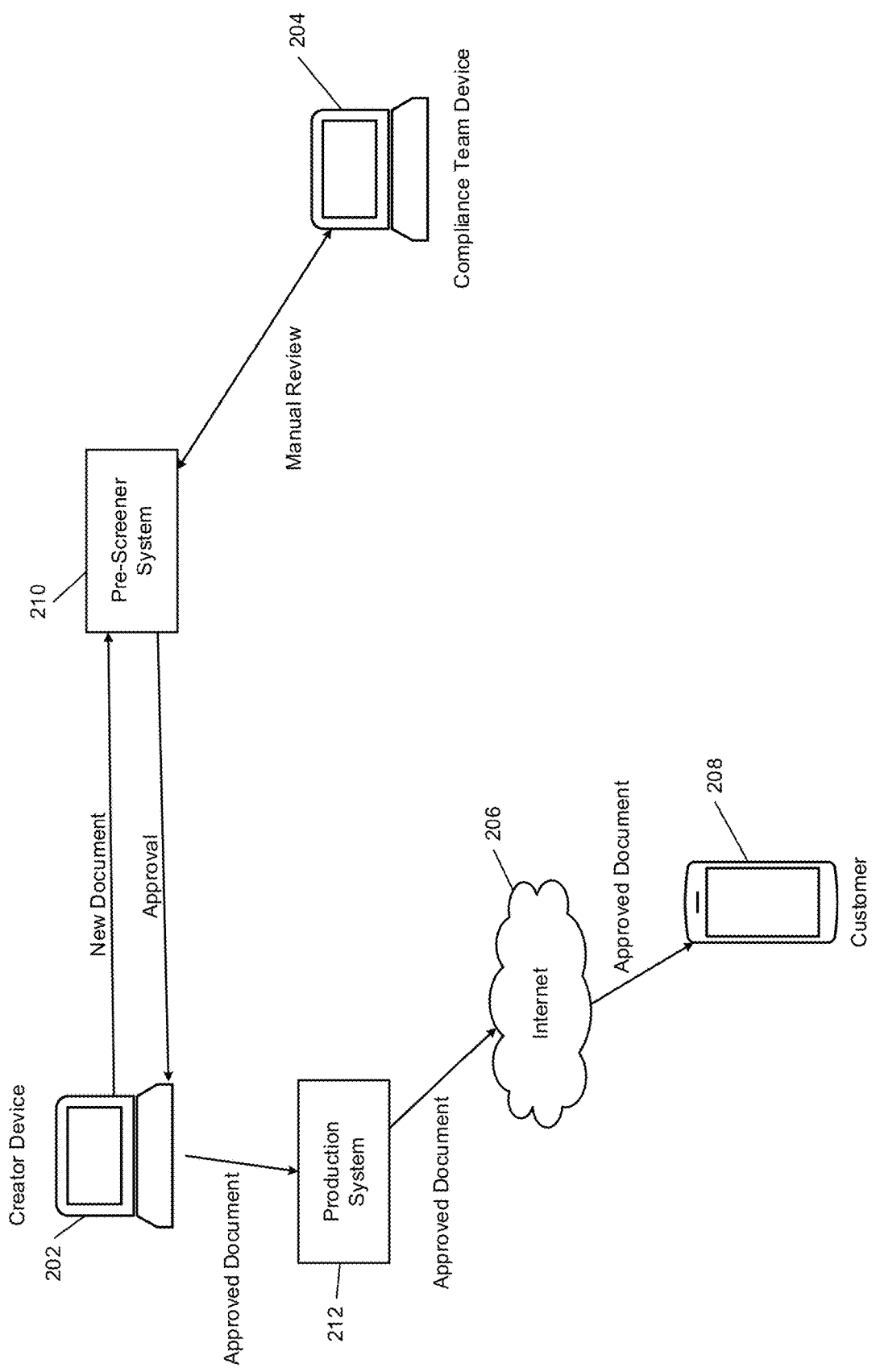
FIG. 2A is a functional block diagram of an example automated system for machine-learned natural language document processing.

FIG. 2A illustrates an example automated compliance review system including a pre-screener system 210. The pre-screener system 210 may include one or more machine learning models that are trained to classify documents submitted from a creator device 202. In various implementations, documents may be fed through a natural language processing (NLP) system for training the machine learning model, for using the machine learning model to classify submitted documents, etc. As described further herein, any suitable machine learning model types may be used to classify the documents, and may be trained to identify monograms, phrases including multiple words, etc. Each model may identify, and possibly edit, one or more common compliance issues, before the document is reviewed by a compliance associate at the compliance team device 204.

Once a document is approved as compliant by a compliance associate at the compliance team device 204, the approved document is returned to the creator device 202 and then transmitted to the production system 212. The production system 212 may then transmit the approved document to a customer device 208, such as via the Internet 206 or other networks. Accordingly, the pre-screener system 210 may reduce time spent editing documents by compliance associates. In various implementations, the pre-screener system 210 may provide feedback to the submitter at the creator device 202, so the submitter can see why the document was not compliant to assist the submitter in future submissions. In various implementations, the pre-screener system 210 may provide suggested changes, suggested text, etc., to the submitter at the creator device 202, in order to increase the likelihood of a revised document being compliant.

The pre-screener system 210 may require submitted documents to meet a minimum standard of compliance (e.g., based on threshold compliance values, etc.), before the pre-screener system 210 submits a document to the compliance team device 204. In various implementations, the pre-screener system 210 may accommodate changes to compliance rules that are implemented in the future, by weighting newer documents more heavily than historical documents during model retraining, by implementing a cutoff window when retraining to exclude historical documents beyond a specified rule change date, etc.

Figure 2B:
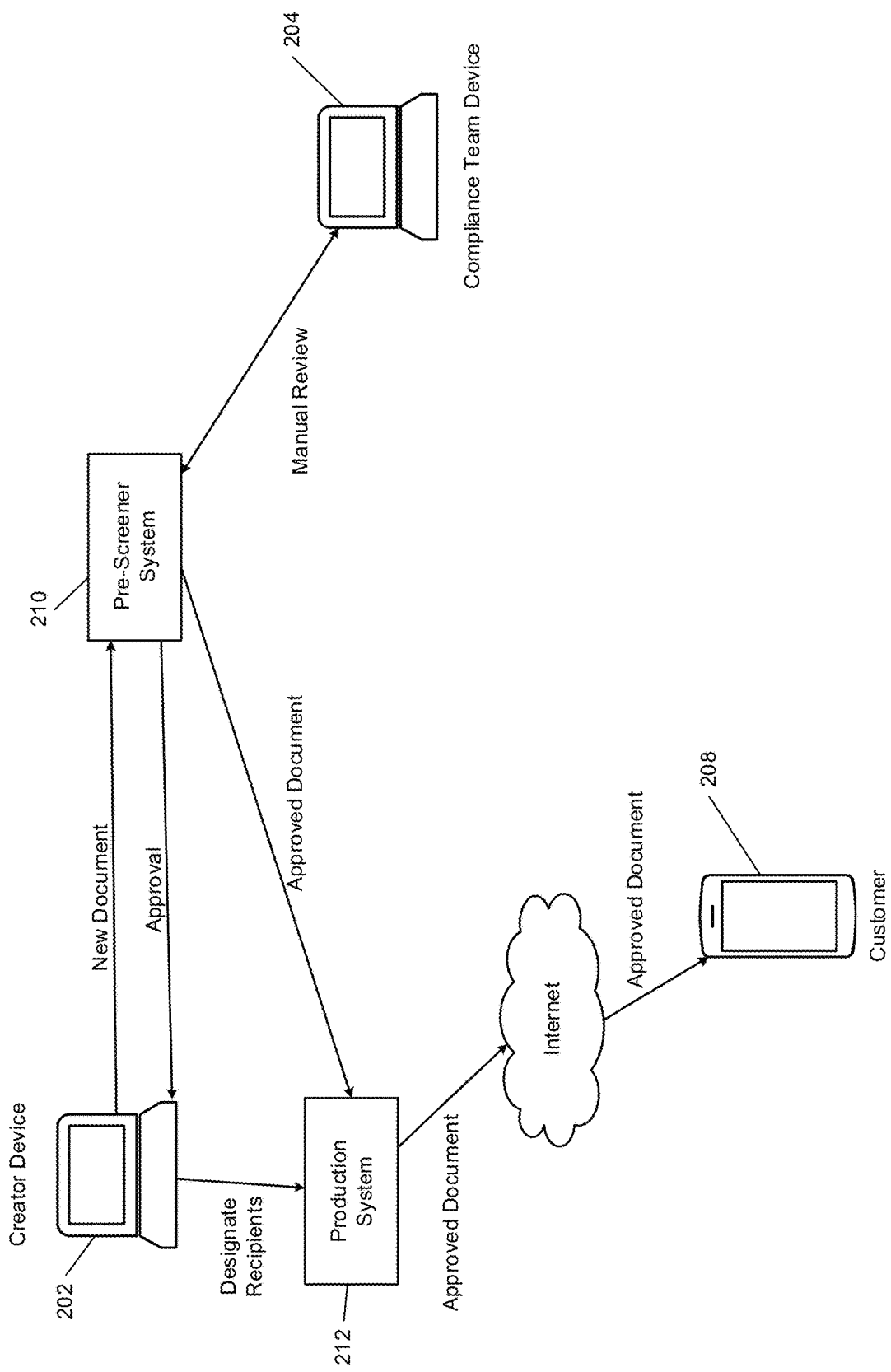
FIG. 2B is a functional block diagram of the system of FIG. 2A including a direct delivery production system.

FIG. 2B illustrates another example system where the pre-screener system 210 can submit compliant documents directly to production system 212. For example, when a compliance associate indicates that a document is compliant via the compliance team device 204, the pre-screener system 210 may transmit the compliant document directly to the production system 212, instead of, or in addition to, sending the document to the original submitter at the creator device 202. This direct transmission from the pre-screener system 210 to the production system 212 may allow for faster transmission of documents to the customer device 208. In various implementations, the compliant document may not be sent to the customer. For example, the document may be stored for internal documentation, saved for further review in the future, etc.

In various implementations, the machine learning model(s) in the pre-screener system 210 may be trained by looking at various versions of historical documents that have already been labeled as non-compliant or compliant. For example, stored documents that have already gone through the process of compliance review previously may have a first version identified as non-compliant and a last version identified as compliant. This historical data can be used to train the machine learning models by submitting the labeled first and last versions of documents to the machine learning model, or even submitting intermediate versions of the document for training (which may also likely be identified as non-compliant). Each model may then be trained to classify whether an input document is compliant or not, which may include providing a score that predicts a likelihood of document compliance as a percentage value, etc.

Some models may include interpretability features that provide feedback, based on historical review comments from compliance associates, based on edits from compliance associates, etc. The feedback may be associated with a specific business unit that submitted the document, the type of document, etc. In various implementations, different words in a document may be assigned weights automatically, and feedback from compliance team members may be used to adjust the weights using a filter, etc. Outputs from a classifier model may be used to improve a natural language processing model for non-compliant documents, where the results of the classifier stage are supplied to the natural language processing stage. In some implementations, each model may be generic to all business units and document types, and in other implementations models may be customized for each business unit, for each document type, etc.

Multiple different types of models may be run simultaneously, where the output results are compared for accuracy during training. In various implementations, different models may be used according to their accuracy for different business units, for different types of documents, etc. Some models may be specifically trained to avoid false negatives, where non-compliant documents are classified as approved or compliant in an incorrect manner. Some models may use open-source tools for model implementation.

In various implementations, SHapley Additive exPlanations (SHAP) values may be used to identify which set of words in a document triggered a non-compliant result for the document. These values may be used to help identify disclaimers that need to be attached to a document. An index tool may identify potential replacements for non-compliant words or phrases, based on prior examples of similar documents. As mentioned above, models may be trained over time to capture updates to regulatory rules, etc., by weighting newer documents heavier than older documents, by applying weights to specific words or phrases, etc.

The pre-screener system 210 may initially require larger amounts of review by compliance associates, and then over time proceed to handle more of the automated compliance pre-screening using the machine learning model(s), as the machine learning models are trained with more and more historical document data. This may allow the compliance associates to, over time, focus more on the portions that require the most significant human review, while the machine learning models can determine which documents are more difficult to review and which documents are more readily screened by the automated process. In various implementations, different classification models may be used to process different details of the same document, etc. Documents may be converted from a Portable Document Format (PDF) to text for analysis by the machine learning models. In other implementations, submitters may be required to submit documents in pure text to avoid conversion issues from PDF to text.

Pre-Screener System

Figure 3:
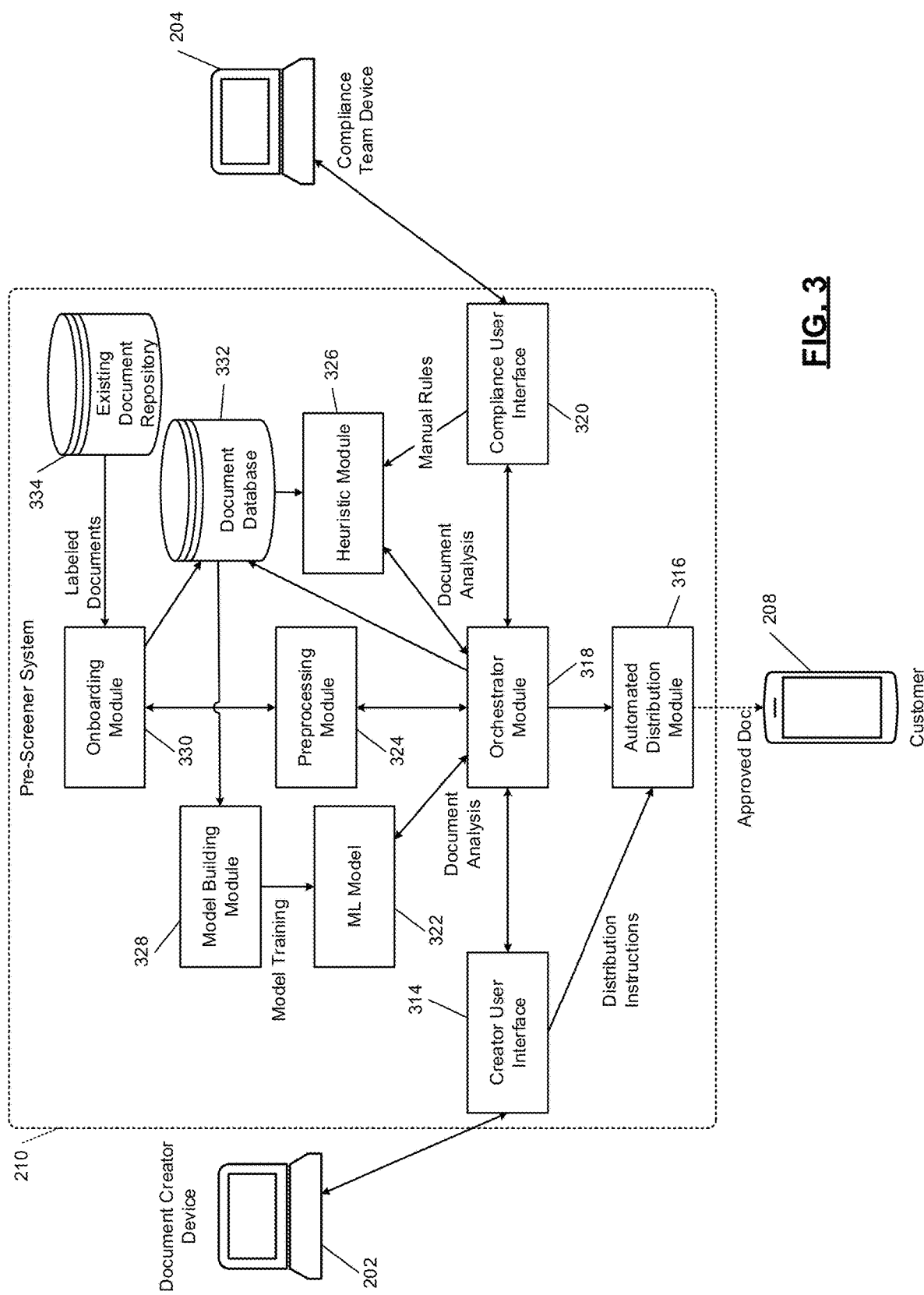
FIG. 3 is a functional block diagram of an example pre-screener system for use in the system of FIG. 2A or FIG. 2B.

FIG. 3 illustrates a block diagram of the pre-screener system 210. As shown in FIG. 3, the pre-screener system 210 includes a creator user interface 314. For example, the creator user interface 314 may display various options, inputs, fields, buttons, etc., for the submitter to supply a document to the pre-screener system 210 for compliance review (e.g., via the creator device 202). The pre-screener system 210 includes an orchestrator module 318 that receives the submitted document from the creator user interface 314.

The orchestrator module 318 may supply the submitted document to a compliance user interface 320, which communicates with a compliance team device 204 to allow compliance review of the submitted document by a compliance team member. For example, the compliance user interface 320 may display the submitted document to the compliance team device 204, may transmit the submitted document to compliance team device 204, may include one or more tools to allow compliance associate to provide feedback or edits to the submitted document, may include options for approving a submitted document, etc.

In various implementations, the orchestrator module 318 may control transmission of documents from the compliance user interface 320 back to the creator user interface 314, when a compliance associate determines that the submitted document is not compliant and needs further changes. The pre-screener system 210 also includes an automated distribution module 316, which may receive an approved document for the orchestrator module 318, or receive an instruction from the creator user interface 314 that a document has been approved, in order to distribute the approved document to the customer device 208.

Prior to transmitting a submitted document from the creator user interface 314 to the compliance user interface 320, the orchestrator module 318 may supply the submitted document to one or more machine learning models 322 and/or heuristic module 326 for automated compliance review of the submitted document. For example, the orchestrator module 318 may supply the submitted document to a machine learning model 322 for the machine learning model 322 to classify the submitted document (e.g., to provide a likelihood of compliance score, etc.).

If the likelihood of compliance is above a specified value (e.g., 80% likely compliant, etc.), the orchestrator module 318 may transmit the document to the compliance user interface 320 for review by a compliance associate, may supply the document to the automated distribution module 316 for transmission to customer device 208, etc. If the machine learning model 322 classifies the document below a threshold likelihood of compliance, the orchestrator module may return the document to the creator user interface 314 so the submitter can improve the document before resubmitting for review by a compliance team associate. In various implementations, the classification score by the machine learning model 322 may be provided to the compliance user interface 320, the creator user interface 314, etc., to provide the submitter or the compliance associate with additional information for reviewing or revising the document.

In various implementations, the orchestrator module 318 may supply the document to a preprocessing module 324, which may use natural language processing to identify features, monograms, phrases, etc., in the document for use by the machine learning model 322, a heuristic module 326, etc. The preprocessing module 324 may return the preprocessing results to the orchestrator module 318 prior to the orchestrator module 318 supplying the document to the machine learning model 322 and/or the heuristic module 326.

In various implementations, a preprocessing module 324 may supply the processed document to an onboarding module 330, which can upload the document to a document database 332. The onboarding module 330 may also receive labeled documents from an existing document repository 334. The labeled documents may be historical documents that have already been identified as compliant or non-compliant during a manual review process, such as first, last, or intermediate versions of documents that have already been through the compliance review process and are labeled as such. The onboarding module 330 can supply the labeled documents to the document database 332. In some instances, the onboarding module 330 may supply the historical documents to the preprocessing module 324, for natural language processing prior to storing the historical documents in the document database 332.

The document database 332 may supply stored documents to the model building module 328, which are used to train the machine learning model 322. For example, the model building module 328 may use historical documents to train one or more machine learning models 322 by submitting versions of documents marked as non-compliant or compliant for the machine learning models 322 to classify the documents. The model building module 328 may continue to train machine learning models 322 over time as more historical documents are created based on compliance reviews by associates at the compliance team device 204. In various implementations, the model building module 328 may account for updates to regulations, guidelines, etc., by placing larger weights on more recent documents and smaller weights on older documents, by using a time cutoff value once rules are changed, etc.

Multiple machine learning models 322 may be trained by the model building module 328 and compared for accuracy, where the model building module 328 selects the most accurate results for use in classifying future documents submitted via the creator user interface 314. In various implementations, different machine learning model types may be used for different business units, for different document types, etc., and the model building module 328 may assign these different models according to the accuracy results, etc.

Example machine learning models that may be suitable for the pre-screener system 210 include, but not are not limited to, linear and logistic regression models, support vector machine models, random forest models, gradient boosted tree models, deep neural network models, Bidirectional Encoder Representations from Transformers (BERT) models, etc. For example, a BERT self-supervised machine learning model may include multiple encoder layers or blocks, each having a number of elements, and may include feed-forward networks and attention heads connected with the encoder layers, may include back propagation between the encoder layer, etc. The BERT model may be used to perform natural language processing on the submitted documents.

As shown in FIG. 3, the heuristic module 326 may receive manual rules from the compliance user interface 320. For example, compliance team associates may provide rules via the compliance team device 204 that indicate certain phrases that should not be used according to the compliance rules, for certain words that should be weighted higher during the automated review process of the submitted documents, etc. The heuristic module 326 may include one or more models, rule sets, etc., that are trained or developed based on historical documents from the document database 332.

The orchestrator module 318 may submit a document received from the creator user interface 314, to the heuristic module 326, in order to determine whether the submitted document meets minimum threshold rules, etc. In various implementations, the heuristic module 326 may provide automated feedback that can be relayed to the submitter with suggested changes, suggested disclaimers, etc., based on rules of the heuristic module 326 and the text of the submitted document.

Figure 4:
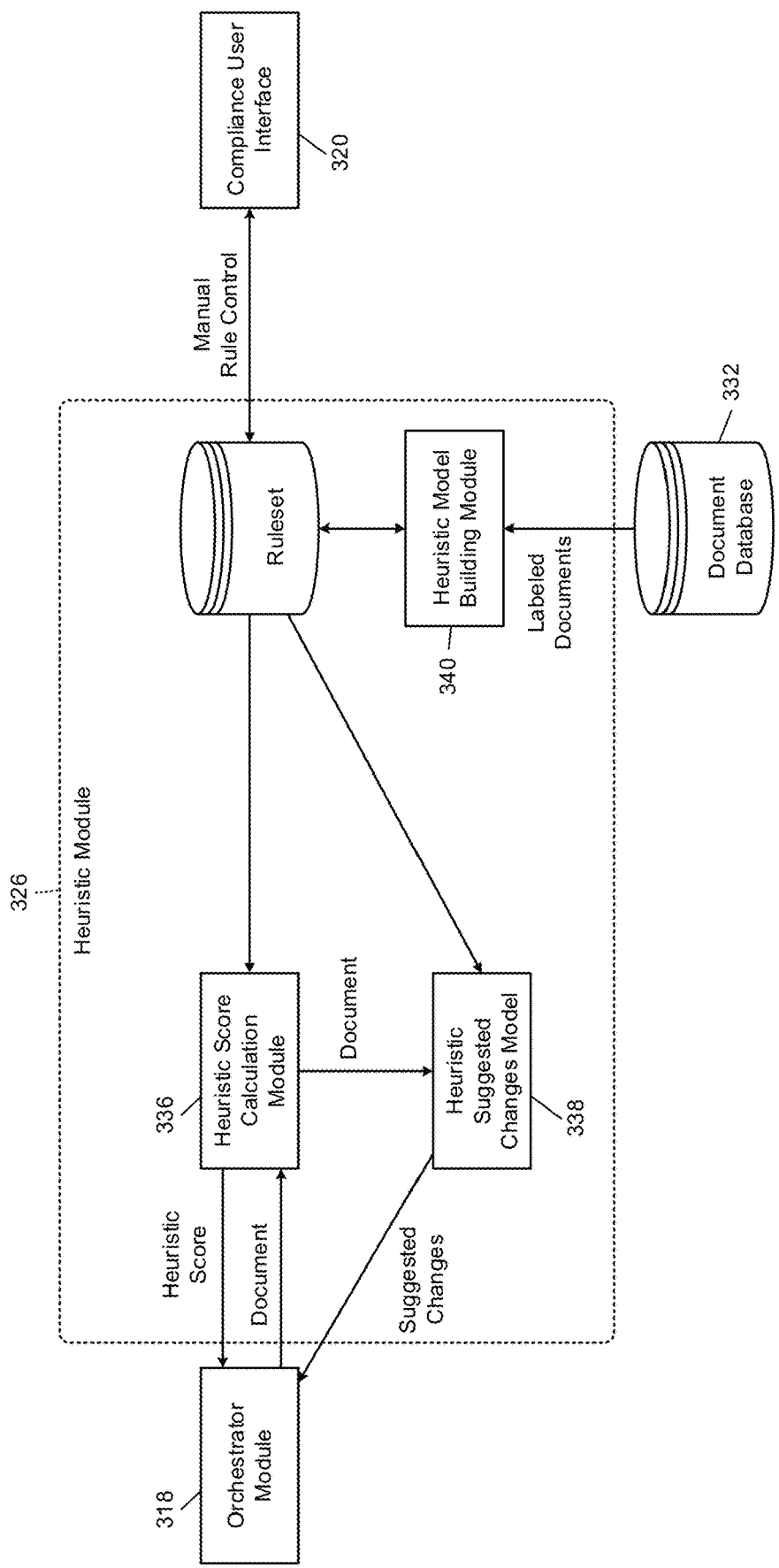
FIG. 4 is a functional block diagram of an example heuristic module for use in the system of FIG. 2A or FIG. 2B.

FIG. 4 illustrates a block diagram of an example heuristic module 326. As shown in FIG. 4, the heuristic score calculation module 336 receives the document from the orchestrator module 318. The heuristic score calculation module 336 may determine a heuristic score for the submitted document according to one or more rules from a rule set. For example, the heuristic score calculation module 336 may apply one or more rules to the document to determine the likelihood of compliance of the submitted document. The heuristic score is then supplied back to the orchestrator module 318, so the orchestrator module 318 can determine whether to pass the submitted document to the compliance review associate, determine whether to return the document to the submitter for further revision, etc.

The heuristic module 326 also includes a heuristic suggested changes model 338, which may receive a document from the heuristic score calculation module 336, may receive a score from the heuristic score calculation module 336, etc. The heuristic suggested changes model 338 may then provide suggested changes back to the orchestrator module 318, which may be based on rules from the rule set. The rules may identify changes that should be made for specific words that are included in the document, for specific phrases or disclaimers that are not included in the document, etc. The suggested changes are sent from the heuristic suggested changes model 338 back to the orchestrator module 318, such that the suggested changes may be supplied to the document submitter in order to improve the likelihood of compliance of the document, etc.

As shown in FIG. 4, the compliance user interface 320 may be used for manual control of rules in the rule set. For example, a compliance associate may specify specific rules for phrases that should be included or not included, may adjust weights for different words or phrases to look for in documents in order to increase the likelihood of compliance or determine whether documents are compliant, etc.

The heuristic module 326 also includes a heuristic model building module 340 that receives label documents from the document database 332. For example, different versions of documents that are labeled as compliant or non-compliant may be supplied to the heuristic model building module 340, in order to create rules in the rule set to determine whether submitted documents are likely compliant or non-compliant.

Automated Compliance Processing

Figure 5:
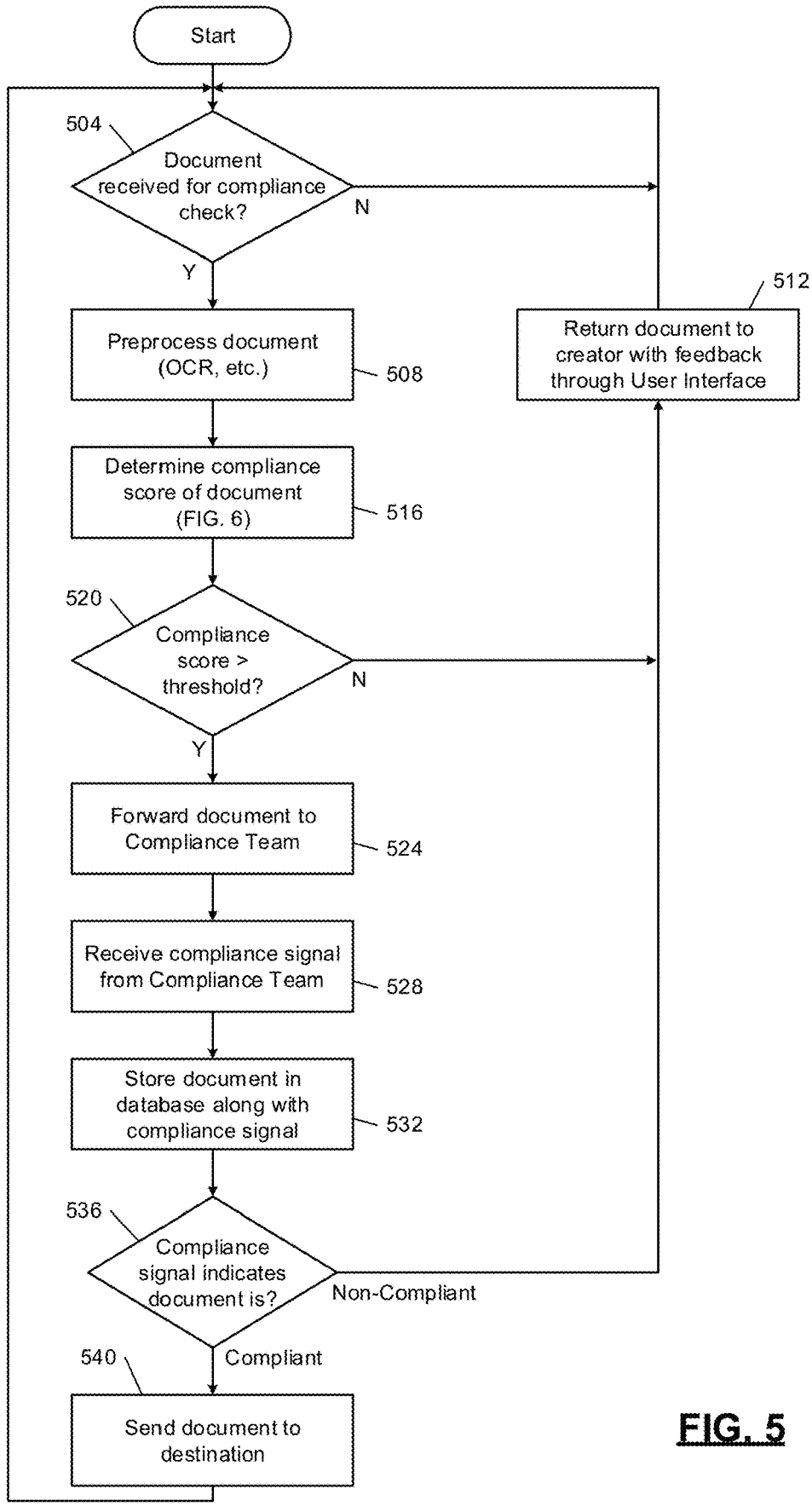
FIG. 5 is a flowchart depicting an example method of automated document compliance processing.

FIG. 5 illustrates an example process for automated determination of document compliance. At 504, control begins by determining whether a document has been received for a compliance check. If not, control returns to 504 to wait to receive a submitted document. Once a document is received at 504, control proceeds to 508 to preprocess the document. Preprocessing at 508 may include optical character recognition (OCR) if the document is in a PDF format, using natural language processing (NLP) to identify words and phrases, etc.

At 516, control determines a compliance score of the document. An example process for determining the compliance score is described further below with reference to FIG. 6. After determining the compliance score for the document at 516, control proceeds to 520 to determine whether the compliance score is greater than a threshold. For example, the threshold may be a value indicative of the likelihood that the documents is compliant, such as a 50% likelihood, a 70% likelihood, an 80% likelihood, etc.

If the compliance score is below the threshold at 520, control proceeds to 512 to return the document to the creator with feedback, through the user interface. For example, if the compliance score indicates that the likelihood of the document passing the compliance review is less than 50%, less than 70%, etc., the document may be returned to the creator with feedback so the document creator can revise and improve the document for subsequent review by a compliance associate, thereby saving unnecessary review time by the compliance associate.

If the compliance score is above the threshold at 520, control proceeds to 524 to forward the document to the compliance team. This allows a compliance associate to review the document, and then control receives a compliance signal from the compliance team at 528. At 532, control stores the document in the database along with the compliance signal.

At 536, control determines whether this compliance signal indicates that the document is compliant or non-compliant. For example, if the compliance associate determined that the document is not compliant after further review, control may proceed to 512 to return the document to the creator with feedback, through the user interface. This allows the document submitter to revise and improve the document before resubmitting the revised document for a further compliance review.

If control determines at 536 that the compliance signal from the compliance associate review indicates the docket is approved, control sends the document to its destination at 540. For example, the approved compliant document may be sent back to the submitter to be transmitted to the customer, the document may be transmitted directly to a production system for automated sending to the customer, etc. After sending the document to the destination at 540, or returning the document to the creator at 512, control returns to 504 to wait for another document to be received for a compliance check.

Figure 6:
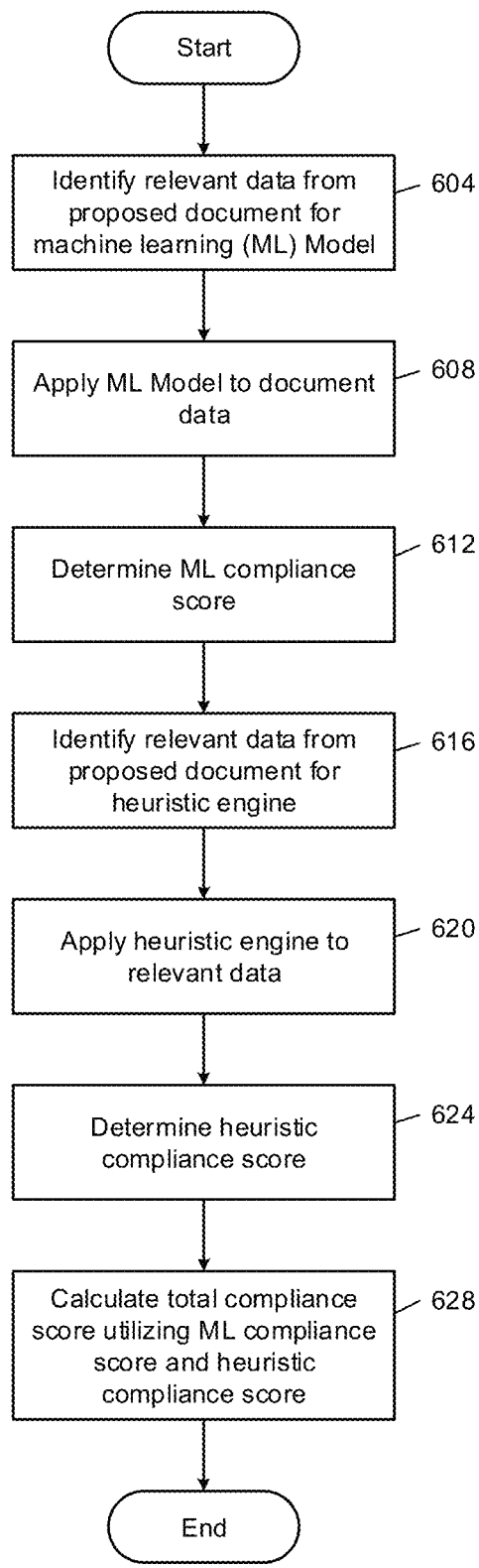
FIG. 6 is a flowchart depicting an example method of compliance score determination for use in the method of FIG. 5.

FIG. 6 illustrates an example flowchart of a process for determining a compliance score for a document. At 604, control identifies relevant data from a proposed document for the machine learning model. For example, natural language processing may be used to identify words and phrases in the document, the identified words and phrases may be placed into feature vectors, etc. At 608, control applies the machine learning model to the document data, and control determines a machine learning compliance score at 612. As mentioned above, the machine learning compliance score may be an indication of a likelihood of the document passing a compliance review by compliance associate.

At 616, control optionally identifies relevant data from the proposed document for a heuristic engine. For example, words, phrases, etc., from the document may be identified using natural language processing, etc., which can be supplied to the heuristic engine to determine whether the document complies with one or more compliance rules. At 620, control applies the heuristic engine to the document data, and control determines a heuristic compliance score at 624. The heuristic compliance score may indicate a likelihood that the document will pass a compliance review by a compliance associate based on one or more heuristic rules.

Control then proceeds to 628 to calculate a total compliance score utilizing the machine learning compliance score and the heuristic compliance score. Although FIG. 6 illustrates combining the machine learning compliance score and the heuristic compliance court to determine the total compliance score, various implementations may utilize only the machine learning compliance score, may utilize only the heuristic compliance score, may utilize a consensus score, may utilize a time decayed score, may utilize a weighted score among different models, etc.

Machine Learning and Heuristic Model Training

Figure 7:
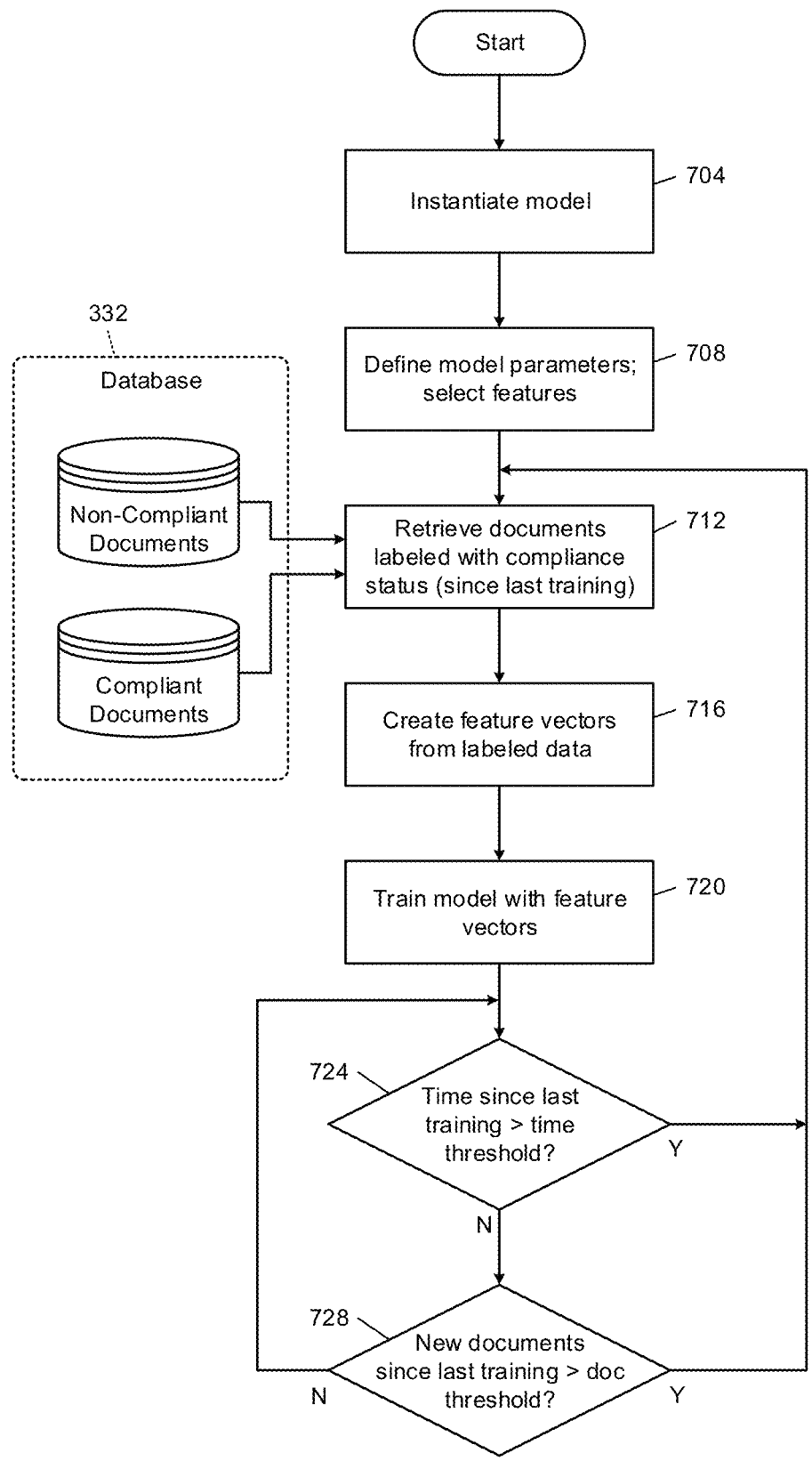
FIG. 7 is a flowchart depicting an example method of training a machine learning model for automated document compliance processing.

FIG. 7 illustrates an example process for training a machine learning model for automated document compliance processing, such as a machine learning model 322 of the pre-screener system 210. At 704, control instantiates a machine learning model, and at 708 control defines the model parameters and selects the model features. For example, any suitable machine learning model may be used, which may be based on testing of various machine learning models and selecting the machine learning model that has the highest accuracy in classifying historical compliant and non-compliant documents. Example machine learning model types that may be suitable for the pre-screener system 210 include, but are not limited to, linear and logistic regression models, support vector machine models, random forest models, gradient boosted tree models, deep neural network models, BERT models, etc.

At 712, control retrieves documents labeled with compliance status. For example, control may retrieve labeled non-compliant and compliant documents from the document database 332. The documents may be labeled according to the first and last versions of previously submitted documents that were initially flagged as non-compliant, and finally approved as compliant after revisions. In various implementations, the machine learning model may be initially trained with historical data, and then updated over time as additional documents complete the compliance review process. In that case, where the machine learning model has already been previously trained based on historical documents, control may only retrieve documents since the prior training at 712.

Control then proceeds to 716 to create feature vectors from the labeled data. For example, natural language processing may be used to identify words, phrases, etc., that can be used to build a feature vector for training the model. Control then trains the model at 720 using the feature vectors based on the labeled historical documents. The model training process may use any suitable training techniques for machine learning models.

At 724, control determines whether the time since the last training of the model is greater than a time threshold (e.g., a period between model update trainings, etc.). For example, model training may be updated every week, every month, every year, etc. If the time since the last training is greater than the time threshold at 724, control proceeds to 712 to retrieve historical documents since the last training that are labeled as compliant or non-compliant.

If the elapsed time since the last training is not greater than the time threshold at 724, control proceeds to 728 to determine whether a number of new documents since the last training is greater than a document threshold. For example, the model may be updated periodically every time that one hundred new documents have been labeled based on completing the compliance associate review process, each time that one thousand new documents have been labeled by completing the compliance associate review process, each time that 10,000 new documents have been labeled since the last training, etc.

If the number of new documents since the last model training is greater than the document threshold at 728, control proceeds to 712 to retrieve those new documents along with their labeled compliance status to further train the model. If the number of new documents since last training is not greater than the threshold number of documents, control may return to 724 to determine whether the elapsed time indicates that the model should be retrained.

Figure 8:
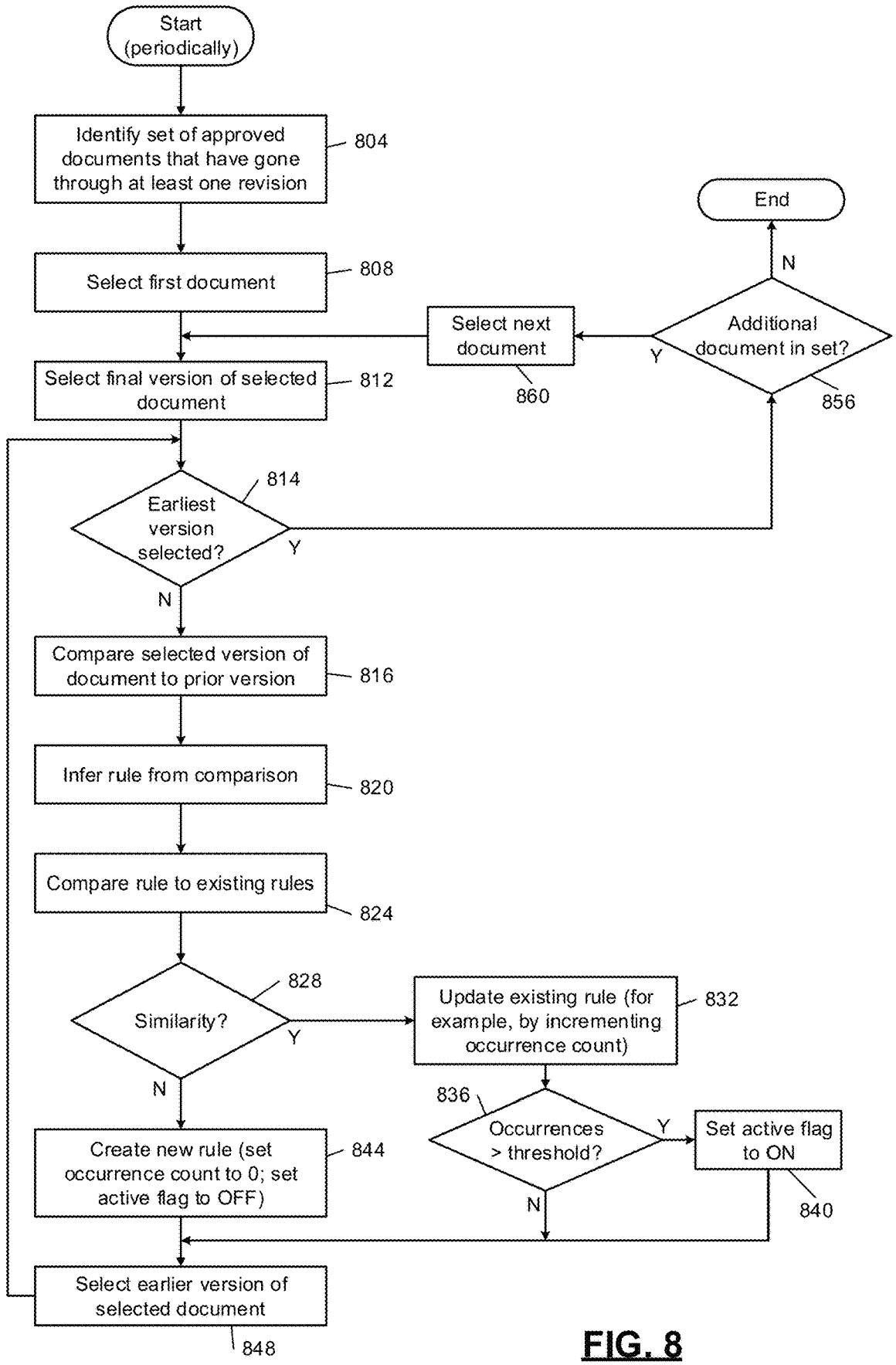
FIG. 8 is a flowchart depicting an example method of training a heuristic model for automated document compliance processing.

FIG. 8 illustrates an example flowchart for a process of training a heuristic model for automated document compliance processing. At 804, control begins by identifying a set of approved documents that have gone through at least one revision. For example, as described above, the database may store historical documents that were initially flagged as non-compliant and then revised to become compliant through the compliance review process.

At 808, control selects a first document, then proceeds to select the final version of the selected document at 812. At 814, control determines whether the earliest version of the document is currently selected. If there is only one version of the document, then the earliest version of the document is the same as the final version of the document. However, if there are multiple versions of the document, the earliest version will be selected after one or more iterations of the following operations. If the earliest version is selected, control transfers to 856; otherwise, control transfers to 816.

Control compares the selected version of the selected document to a prior version of the document at 816. For example, after picking a document, control may compare the final version (which would likely be indicated as compliant), to an earlier version of the document (that would likely have been flagged as non-compliant).

Control infers a rule from the comparison and 820. For example, control may look at changes that were made between from the prior version to the final version, may look for words and phrases that were edited or removed, disclaimers or other phrases that were added, etc. Control may then infer a rule that the document should include a specific disclaimer phrase that was added, the document should not include certain words or phrases that were removed, etc., in order to make the document compliant.

At 824, control compares the inferred rule to existing rules, such as a rule set in a database, etc. At 828, control determines whether the inferred rule from the comparison of document versions is similar to an existing rule in the rule set. If yes, control proceeds to 832 to update the existing rule. For example, control may increment a count of the occurrences of the existing rule. At 836, if the number of occurrences is greater than a threshold, control sets an active flag to ON at 840 and continues at 848. Setting the active flag may indicate that the rule is a strong predictor of document compliance, a strong requirement for determining whether the document is in compliance, etc. Otherwise, if the number of occurrences is below a threshold, control transfers directly to 848.

If control determines at 828 that the inferred rule from the document version comparison is not similar to any existing rules, control may proceed to 844 to create a new rule. This may involve setting an occurrence count of the new rule to zero, setting an active flag for the new rule to OFF, etc. For example, control may determine the difference between compliant and non-compliant versions of the document and establish a new rule that encompasses the difference, without yet knowing whether the difference is significant across multiple documents to indicate whether the rule is important. After creating the rule at 844, control continues at 848.

At 848, control selects an earlier version of the presently selected document. For example, if a document has three versions where the first two are flagged as non-compliant and the final version flagged as compliant, control may first execute the above inference and comparison steps between the middle version and the final version, and then again between the middle version and the first version. After 848, control returns to 814.

At 856, there are no additional versions of the presently selected document to evaluate. Therefore, control determines whether there are any additional documents in the set. If so, control proceeds to 860 to select the next document and then proceeds to 812 to start a new process of comparing the final version of the next selected document to a prior version to infer new or existing rules. If there are no further documents at 856, control ends the heuristics training process.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
memory configured to store a document database, a ruleset database, a heuristic suggested changes model, a heuristic score model, and a machine learning model, wherein the document database includes multiple historical documents each having at least one version labeled as compliant and at least one version labeled as non-compliant, the at least one version labeled as compliant being a revision including one or more changes to the at least one version labeled as non-compliant; and at least one processor configured to execute instructions stored in the memory to cause the computer system to, receive a submitted document from a document creator device for automated document compliance processing;

transmit the submitted document to a compliance team device for document compliance review;

transmit an approved document to a customer computing device;

obtain the multiple historical documents from the document database and train the machine learning model to classify a document according to a compliance score indicating a likelihood of document compliance with one or more compliance criteria, by submitting to the machine learning model as training data, for each of the multiple historical documents, the at least one version of the historical document labeled as compliant and the at least one version of the historical document labeled as non-compliant;

train the heuristic score model by, for each of the multiple historical documents,
comparing the at least one version of the historical document labeled as compliant to the at least one version of the historical document labeled as non-compliant,
inferring a rule from comparing versions of the historical document, wherein the rule includes at least one of a phrase removed between versions of the historical document, or a phrase added between versions of the historical document,
comparing the inferred rule to existing rules in the ruleset database,
incrementing a count in response to a determination that the inferred rule matches an existing rule in the ruleset database, and setting an active flag to on in response to the count exceeding a threshold, and
creating a new rule in response to a determination that the inferred rule does not match an existing rule in the ruleset database, and setting an occurrence count to zero and an active flag to off for the new rule;

receive the submitted document from the document creator device;

supply the submitted document to the machine learning model;

receive the compliance score for the submitted document from the machine learning model;

determine whether the compliance score is greater than or equal to a compliance score threshold;

in response to a determination that the compliance score is greater than the compliance score threshold, supply the submitted document to the compliance team device; and in response to a determination that the compliance score is less than the compliance score threshold, determine, using the heuristic suggested changes model, one or more suggested changes to increase the likelihood of compliance of the submitted document with the one or more compliance criteria, the one or more suggested changes determined according to one or more rules stored in the ruleset database, and the one or more suggested changes including at least one of a specific word included in the submitted document or a specific phrase or disclaimer not included in the document, and supply the one or more suggested changes associated with the submitted document to the document creator device to provide feedback to a document creator regarding the submitted document.

2. The computer system of claim 1, wherein the at least one processor is configured to execute the instructions to perform natural language processing on the submitted document prior to supplying the submitted document to the machine learning model to identify at least one word or phrase for adding to a feature vector.

3. The computer system of claim 1, wherein the at least one processor is configured to execute the instructions to apply the one or more rules to the submitted document to generate a heuristic score indicating a likelihood of document compliance with the one or more compliance criteria.

4. The computer system of claim 3, wherein the ruleset database is configured to receive one or more rule control inputs from the compliance team device to modify the one or more rules; and the at least one processor is configured to execute the instructions to determine the heuristic score for the submitted document.

5. The computer system of claim 3, wherein the at least one processor is configured to calculate a total compliance score utilizing the compliance score received from the machine learning model and the heuristic score.

6. The computer system of claim 1, wherein the at least one processor is configured to, in response to a determination that the compliance score is less than the compliance score threshold, execute the instructions to supply the submitted document back to the document creator device for further revisions.

7. The computer system of claim 1, wherein the at least one processor is configured to execute the instructions to:

in response to supplying the submitted document to the compliance team device, receive a compliance signal from the compliance team device;

in response to the compliance signal indicating that the submitted document is compliant, transmit the submitted document to the customer computing device as an approved document; and in response to the compliance signal indicating that the submitted document is non-compliant, supply the submitted document back to the document creator device for further revisions.

8. The computer system of claim 1, wherein the machine learning model includes at least one of a linear regression model, a logistic regression model, a support vector machine model, a random forest model, a gradient boosted tree model, a deep neural network models, and a Bidirectional Encoder Representations from Transformers (BERT) model.

9. A computerized method of automated natural language document processing using a machine learning model, the method comprising:

obtaining multiple historical documents from a document database, wherein the document database includes multiple historical documents each having at least one version labeled as compliant and at least one version labeled as non-compliant, the at least one version labeled as compliant being a revision including one or more changes to the at least one version labeled as non-compliant;

training a machine learning model to classify a document according to a compliance score indicating a likelihood of document compliance with one or more compliance criteria, by submitting to the machine learning model as training data, for each of the multiple historical documents, the at least one version of the historical document labeled as compliant and the at least one version of the historical document labeled as non-compliant;

training a heuristic score model by, for each of the multiple historical documents, comparing the at least one version of the historical document labeled as compliant to the at least one version of the historical document labeled as non-compliant, inferring a rule from comparing versions of the historical document, wherein the rule includes at least one of a phrase removed between versions of the historical document, or a phrase added between versions of the historical document, comparing the inferred rule to existing rules in a ruleset database, incrementing a count in response to a determination that the inferred rule matches an existing rule in the ruleset database, and setting an active flag to on in response to the count exceeding a threshold, and creating a new rule in response to a determination that the inferred rule does not match an existing rule in the ruleset database, and setting an occurrence count to zero and an active flag to off for the new rule;

receiving, via a creator user interface, a submitted document from a document creator device for automated document compliance processing;

processing the submitted document using the machine learning model to determine the compliance score for the submitted document;

determining whether the compliance score is greater than or equal to a compliance score threshold;

in response to a determination that the compliance score is greater than the compliance score threshold, supplying the submitted document to a compliance team device, via a compliance user interface, for document compliance review; and in response to a determination that the compliance score is less than the compliance score threshold, determine, using a heuristic suggested changes model, one or more suggested changes to increase the likelihood of compliance of the submitted document with the one or more compliance criteria, the one or more suggested changes determined according to one or more rules stored in a ruleset database, and the one or more suggested changes including at least one of a specific word included in the submitted document or a specific phrase or disclaimer not included in the document, and supply the one or more suggested changes associated with the submitted document to the document creator device to provide feedback to a document creator regarding the submitted document.

10. The method of claim 9, further comprising performing natural language processing on the submitted document prior to supplying the submitted document to the machine learning model to identify at least one word or phrase for adding to a feature vector.

11. The method of claim 9, further comprising applying the one or more rules to the submitted document to generate a heuristic score indicating a likelihood of document compliance with the one or more compliance criteria.

12. The method of claim 11, further comprising receiving one or more rule control inputs from the compliance user interface to modify the one or more rules.

13. The method of claim 11, further comprising calculating a total compliance score utilizing the compliance score determined by the machine learning model and the heuristic score.

14. The method of claim 9, further comprising, in response to a determination that the compliance score is less than the compliance score threshold, supplying the submitted document back to the creator user interface for further revisions.

15. The method of claim 9, further comprising:
in response to supplying the submitted document to the compliance user interface for transmission to the compliance team device, receiving a compliance signal from the compliance team device via the compliance user interface;
in response to the compliance signal indicating that the submitted document is compliant, transmitting the submitted document to a customer computing device as an approved document; and
in response to the compliance signal indicating that the submitted document is non-compliant, supplying the submitted document back to the creator user interface for further revisions.

16. The method of claim 9, wherein the machine learning model includes at least one of a linear regression model, a logistic regression model, a support vector machine model, a random forest model, a gradient boosted tree model, a deep neural network models, and a Bidirectional Encoder Representations from Transformers (BERT) model.

* * * * *